United States Patent
Duffy et al.

(10) Patent No.: US 9,175,555 B2
(45) Date of Patent: Nov. 3, 2015

(54) FLUID INJECTION COMPLETION TECHNIQUES

(76) Inventors: Brian W. Duffy, Houston, TX (US); Rahul Pakal, Pearland, TX (US); Ted A. Long, Sugar Land, TX (US); Bruce A. Dale, Sugar Land, TX (US)

(*) Notice: Subject to any disclaimer, the term of this patent is extended or adjusted under 35 U.S.C. 154(b) by 561 days.

(21) Appl. No.: 12/596,316

(22) PCT Filed: Jun. 25, 2009

(86) PCT No.: PCT/US2009/048671
§ 371 (c)(1),
(2), (4) Date: Mar. 29, 2011

(87) PCT Pub. No.: WO2010/021786
PCT Pub. Date: Feb. 25, 2010

(65) Prior Publication Data
US 2011/0162848 A1    Jul. 7, 2011

Related U.S. Application Data

(60) Provisional application No. 61/090,001, filed on Aug. 19, 2008.

(51) Int. Cl.
*G01V 1/40* (2006.01)
*E21B 43/16* (2006.01)
*G01V 11/00* (2006.01)

(52) U.S. Cl.
CPC .............. *E21B 43/16* (2013.01); *G01V 11/00* (2013.01)

(58) Field of Classification Search
CPC ..... E21B 43/20; E21B 43/26; E21B 17/1028; E21B 43/25; E21B 47/022; G01V 11/00
USPC ............... 702/6, 11, 12, 13; 166/213; 703/10; 616/213, 305.1
See application file for complete search history.

(56) References Cited

U.S. PATENT DOCUMENTS

| | | |
|---|---|---|
| 4,137,969 A | 2/1979 | Phalangas et al. |
| 4,204,574 A | 5/1980 | Stalder |
| 4,687,059 A | 8/1987 | Pathak et al. |

(Continued)

OTHER PUBLICATIONS

H. Oumeraci et al, Impact Loading and Dynamic Response of Caisson Breakwaters—Results of Large-Scale Model Tests-, Nov. 23, 1992, Chapter 113, p. 1475-1488.*
Roberto Caracciolo et al; "Application of caussuality check and of the reduced variables method for experimental determination of Young's modulus of viscoelastice material"; 2001; Mechanics of Materials 33, pp. 693-703.*
S. O. Ovadiji et al; "Determination of the Complex Moduli of Viscoelastic Structural Elements by Resonance and Non-Resonance Methods"; 1985; Journal of Sound and Vibration; 101(3); pp. 277-298.*

(Continued)

*Primary Examiner* — Eliseo Ramos Feliciano
*Assistant Examiner* — Eman Alkafawi

(57) ABSTRACT

Methods for injecting a fluid into a subsurface formation are provided. Each of the methods includes the obtaining data, including formation parameters and operational variables, related to an injection well. A regime of operation for the injection well is determined. The regime of operation is determined using a heuristic model. In one aspect, one or more operational variables, including completion design, reservoir development procedures, and/or injection procedures, is designed based at least in part on the determined regime of operation. Water or other fluid may then be injected into the subsurface formation. The step of determining the regime of operation for the injection well may use a full physics computational simulation to construct a mathematical model that can estimate the operating regime for the water injection well. Alternatively or in addition, field data may be used.

21 Claims, 6 Drawing Sheets

(56) References Cited

U.S. PATENT DOCUMENTS

| | | | |
|---|---|---|---|
| 5,038,864 | A | 8/1991 | Dunleavy et al. |
| 5,095,989 | A | 3/1992 | Prukop |
| 5,464,059 | A | 11/1995 | Kristiansen |
| 5,632,336 | A | 5/1997 | Notz et al. |
| 6,016,868 | A | 1/2000 | Gregoli et al. |
| 6,227,296 | B1 | 5/2001 | Reppert et al. |
| 2006/0122777 | A1 | 6/2006 | Patzek et al. |
| 2007/0294034 | A1 | 12/2007 | Bratton et al. |
| 2009/0308609 | A1* | 12/2009 | Curole et al. .......... 166/275 |
| 2010/0004906 | A1* | 1/2010 | Searles et al. ............ 703/2 |
| 2011/0011595 | A1* | 1/2011 | Huang et al. ............ 166/369 |

OTHER PUBLICATIONS

S. Sim et al; "A Method to Determine the Complex Modulus and Poisson's Ratio of Viscoelastic Materials for FEM Applications"; 1990; Journal of Sound and Vibration; 141(1); pp. 71-82.*

Fontana, C. et al., "Successful Application of a High Temperature Viscoelastic Surfactant (VES) Fracturing Fluid Under Extreme Conditions in Patagonia Wells San Jorge Basin", IBP1362-06, Sep. 2006, pp. 1-13, Rio Oil and Gas 2006 Expo and Conf.

International Search Report, Jun. 25, 2009, PCT/US2009/048671.

\* cited by examiner

FLUID INJECTION COMPLETION TECHNIQUES

CROSS REFERENCE TO RELATED APPLICATIONS

This application is the National Stage application under 35 U.S.C. 371 of International Application No. PCT/US09/048671, filed on 25 Jun. 2009, which claims the benefit of U.S. Provisional Application No. 61/090,001, filed 19 Aug. 2008, each of which is incorporated herein by reference in its entirety for all purposes.

BACKGROUND

1. Field

The present invention relates to the field of enhanced hydrocarbon recovery operations. More specifically, the present invention relates to procedures for injecting water or other fluid into subsurface formations such as weak or unconsolidated formations.

2. Background

Hydrocarbon recovery processes often employ injection wells, such as water injection wells, in connection with the extraction of oil and gas from subsurface formations. One of several reasons may exist for injecting water into a formation. In some instances water injection wells are used to maintain pressure in a reservoir during production. Alternatively, water injection wells may be used to push or "sweep" in-place hydrocarbon fluids towards producing wells. Such purposes relate to enhanced oil recovery.

In some cases, water injection may be used as a means of disposing produced but unwanted water. The water is typically a salt water solution, or brine. The water may include fines or waste solids, thereby forming an aqueous slurry. In addition, the water may include residual hydrocarbon fluids, formation treatment chemicals, corrosion products and biological organisms.

The success of any water injection well depends on maintaining an appropriate injection capacity, or "injectivity," over the planned lifetime of the development. A decline of well injectivity results in the injection of reduced volumes of water into a targeted subsurface formation. This, in turn, results in sub-optimal pressure maintenance or oil sweep to producing wells, or inadequate disposal of water into the subsurface formation.

The injectivity of a well ("II") is defined as the ratio of the injection rate to the pressure differential between the fluid in the well bore and the "far field" reservoir pressure:

$$II = Q_{inj} / (P_{inj} - P_{res})$$

wherein:
$Q_{inj}$=injection rate;
$P_{inj}$=flowing bottom hole injection pressure; and
$P_{res}$=reservoir pressure.

Various ways of monitoring the flowing bottom hole injection pressure ("FBHP") exist. These include downhole gauges and calculating the FBHP from wellhead pressure measurements.

Several different influences can reduce the "II" of a well. For example, contaminants in the injected fluid can plug either the openings in the downhole tubulars or the pore spaces in the subsurface formation. Such contaminants may include scale, corrosion products and fines in solution. In the context of offshore operations, contaminants may also include biological organisms from seawater that pass through water filters. Changes to the rock formation itself can also reduce injectivity. Such changes may include fines migration, compaction of the rock in the near wellbore region, or gross deformation of the rock.

Build-up of reservoir pressure can also change an injection well's "II." In this respect, if reservoir pressure decreases, then the pressure differential increases. This, in turn, reduces the value of "II" from the equation. Of course, it is noted that injection wells are typically run at a constant rate, so changes in reservoir pressure are usually offset by changes in wellhead pressure. At the same time, completion engineers will understand that an injection well design may be flawed when a well is subject to plugging such that a constant rate cannot be maintained.

The regime of operation of an injection well can also determine which of these processes may impact the "II" of an injector. Generally, there are three possible modes of operation for injection wells: (1) matrix diffusion, (2) formation fracture, and (3) formation fluidization. These regimes are discussed generally below.

(1) Matrix injection means that water is injected into the pore spaces of a rock formation at a pressure that is less than the formation fracture pressure. Matrix injection is characterized by radial Darcy flow of the injected fluid through the porous media. In some cases an enhanced matrix injection will be employed that starts with a propped fracture stimulation to delay the effects of contaminant plugging.

(2) Formation fracture injection means that the formation is fractured as a result of the injection process. This may be done through the formation of artificial fractures using one or more injection fluids under pressure, such as a proppant-based fracture fluid, water, or an aqueous solution. When the mode of injection is formation fracture, the increase in pressure from the injected fluid creates a physical parting of the rock formation. The injected fluid flows into the void created by the fracture of the rock and eventually diffuses into the pores of the rock exposed by the fracture. Preferably, the fracturing injection process extends the fractures as necessary to maintain a desired injection rate. In addition, the newly opened fracture faces provide for increased surface area as needed to maintain the injection rate.

(3) The formation fluidization mode of injector operation occurs when stress created in the subsurface formation by the injection operation causes inelastic deformation of the porous media within the subsurface formation in a region beyond the crack tip. When the mechanical deformation of the formation during injection is not governed by linear elastic fracture mechanics ("LEFM"), the formation does not "fracture" in the classical sense. Fracture processes therefore cannot be modeled using LEFM theory. In practice, the injection pressure continues to rise, but the formation does not receive more water. It is noted that LEFM assumes that plastic deformation is limited to an infinitely small region at the tip. In the formation fluidization mode, the formation is such that the plastic zone is much more extensive. The formation goes through a failure process rather than forming a discrete fracture. As a result, the $P_{inj}$ value continues to increase after material failure occurs as opposed to brittle LEFM fractures which have a defined fracture extension pressure based on formation mechanical properties, the in-situ stress field and other related variables.

A decline in a well's injectivity ("II") results in the injection of reduced volumes of water into the target subsurface formation. In the case of enhanced recovery operations, this results in sub-optimal pressure maintenance or oil sweep to producing wells. This, in turn, can negatively impact a field's hydrocarbon recovery processes. In the case of simple water disposal, a decline in well injectivity results in an inadequate disposal of water/liquid wastes into the subsurface formation or injection pressures that may risk a loss of containment.

Correlations can generally be made concerning the effect of geomechanical forces on injectivity. If a targeted subsurface formation can be mechanically characterized as a low compressibility, stiff, and strong shear strength rock, then as injectivity decreases, the increase in operating injection pressure is typically overcome via fracturing of the targeted rock formation. This fracturing phenomenon often results in a stabilization of the well's injectivity, thereby providing a relatively constant injection pressure at a constant rate of water injection.

On the other hand, if a targeted subsurface formation can be mechanically characterized as a highly compressible, uncemented, weak-shear-strength rock, then a loss of injectivity can occur, particularly at high water injection rates. This is a result of several factors such as near-wellbore rock and/or sand fluidization and the creation of rock fines that plug pore spaces. The presence of injected particulate matter can also plug the near-wellbore matrix. The low strength and high compressibility of the rock formation minimizes the chance that a fracture will form or propagate into the rock formation. Without the "clean" rock surface exposed by a propagating fracture, the "II" of the well can decline rapidly.

Formations having a weak shear strength or having characteristics of being compressible and unconsolidated are located in various fields around the world. Examples include developments in West Africa, Gulf of Mexico, Chad, and Sakhalin (an island off the coast of mainland Russia and just north of Japan). In such developments it is a challenge to maintain injection capacity and reliability of water injection wells.

Therefore, it is desirable to have a method for designing and operating fluid injectors in highly compressible, weakly-cemented, weak-shear-strength rock formations that avoids the loss of injectivity seen in such wells.

SUMMARY

Methods of injecting a fluid into a subsurface formation are provided. The methods may include designing and/or implementing drilling operations, completion operations, production operations, and/or injection operations. The methods include obtaining data for use in the methods. The obtained data includes an initial set of formation parameters related to a subsurface formation and an initial set of operational variables related to an injection well in the subsurface formation. The methods further include determining a regime of operation for the injection well using a heuristic model. The heuristic model is derived from data points correlated to various regimes of operation. The determination is based at least in part on the obtained data. The methods continue by identifying at least one designed operational variable for conducting injection operations, wherein the identification is based at least in part on the determined regime of operation.

In some implementations, the methods may be performed on an existing well. For example, data related to an existing water injection well may be obtained and the regime of operation may be determined using the heuristic model. Similarly, data related to an existing production well may be obtained to determine a mode of operation for a planned injection operation, such as a treatment or for conversion to an injection well. Additionally or alternatively, the present methods may be performed on a planned well using planned and/or simulated data. For example, formation parameters may be obtained related to an area in which an injection well is to be provided. The present methods may be used to determine the regime of operation for an initial set of operational variables, such as an initial well completion plan, reservoir development plan, and injection plan. The determined regime of operation may inform the design process resulting in identified designed operational variables.

In some implementations, the designed operational variables are the same as the initial set of operational variables. In other implementations, the designed operational variables may differ from the initial set in at least one manner. In some implementations, the designed operational variables may be selected to shift the regime of operation from one regime to another. For example, the heuristic model may indicate whether the regime of operation is in a formation fluidization regime, a formation fracture regime, or a matrix injection regime. The designed operational variables may be selected to shift the regime of operation between any two such regimes, such as from the formation fluidization regime to the formation fracture regime. In implementations where the designed operational variables are changed, changing the operational variables may include modifying a completion design, modifying reservoir development procedures, modifying injection procedures, or combinations thereof.

Modifying a completion design may include a variety of steps depending on the initial condition of the well (e.g., existing well; existing, completed, injection well; proposed well, etc.). Exemplary operations that may be conducted in modifying a completion design include: (i) providing equipment to heat or cool the injected fluids, (ii) providing equipment to add viscosity modifiers to the injected fluid, (iii) providing equipment to pump the injected fluid at an increased rate or pressure, (iv) modifying downhole equipment for the injection well, or (v) combinations thereof.

Similarly, modifying injection procedures may include a variety of aspects, including (i) modifying an injection rate, (ii) modifying a viscosity of the fluid to be injected, (iii) modifying a temperature of the fluid to be injected, (iv) modifying a depth at which the fluid is injected, or (v) combinations thereof. Additionally, modifying reservoir development procedures may include (i) modifying a reservoir depletion plan, (ii) modifying the location of the injection well, (iii) adding an additional injection well, (iv) modifying a drilling plan for the injection well, (v) reducing the pore pressure in the subsurface formation, or (vi) combinations thereof. As one further example, reducing the pore pressure in the subsurface formation may include producing from the subsurface formation prior to operating the injection well.

The methods may further include conducting injection operations in an injection well. In implementations utilizing an existing injection well, conducting the injection operation may be simply continuing with the injection operations having a knowledge of the regime of operation. For example, it may be determined that the designed operational variables are the same as the operational variables being utilized before determining the regime of operation. In other implementations, the determined regime of operation may suggest a change in one or more operational variables. In some such implementations, the utilization of the changed designed operational variable may shift the regime of operation from a formation fluidization regime or a matrix injection regime to a formation fracture regime. In implementations of the present methods for the design of a new well, the injection operations may proceed with the designed operational variables, which may be the same or different compared to the initial operational variables.

In some implementations of the present methods, the determination of the regime of operation may include 1) inputting the obtained data for the injection well into the heuristic model to generate an initial data point, and 2) determining whether the initial data point falls within a formation fluidization regime, a formation fracture regime, or a matrix injection regime. Similarly, when the designed operational variables are different from the initial operational variables, the methods may further comprise 1) determining a modified regime of operation for the injection well using the heuristic model and the designed operational variables, and 2) determining whether the modified regime of operation falls within the formation fluidization regime, the formation fracture regime, or the matrix injection regime.

In some implementations, the heuristic model uses full physics computational simulations to construct a mathematical model that can predict the operating regime of an injection well. Alternatively or in addition, the heuristic model may be based upon field data. The heuristic model may comprise a graph that plots (a) the ratio of the formation's effective shear strength to the in-situ geomechanical load versus (b) the ratio of the hydraulic load placed on the rock formation to the formation's transmissibility potential at different, given sets of input parameters. Additionally or alternatively, the methods may use other heuristics models. An example is a model wherein data points have been plotted for pressure as a function of time during injection into a subsurface formation.

In implementations wherein the heuristic model utilizes constructed mathematical models, the mathematical model may be constructed by i) calculating the ratio of the formation's effective shear strength to the in-situ geomechanical loads at various input parameters, wherein the various input parameters comprise formation parameters and operational variables; ii) calculating the ratio of the hydraulic load placed on the rock formation to the formation's transmissibility potential at the various input parameters; iii) determining for each of the various input parameters whether (a) formation fluidization occurred, (b) formation fracturing occurred, or (c) matrix injection occurred; and iv) plotting the calculated ratios as data points on a graph, the graph being divided into sections representing (a) a formation fluidization regime, (b) a formation fracture regime, and (c) a matrix injection regime. For example, the data points plotted on the graph may represent the ratio of the hydraulic load placed on the rock formation to the formation's transmissibility potential (the y-axis) versus the ratio of the formation's effective shear strength to the in-situ geomechanical loads (the x-axis) at the various input parameters.

In implementations wherein the heuristic model includes a graph of multiple data points from prior wells and/or from prior simulations, the graph may permit a user to visually identify which of three modes of operation may prevail in the subsurface formation during a fluid injection process, the three modes representing (a) the formation fluidization regime, (b) the formation fracturing regime, or (c) the matrix injection regime.

BRIEF DESCRIPTION OF THE DRAWINGS

So that the present invention can be better understood, certain drawings, charts and/or graphs are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
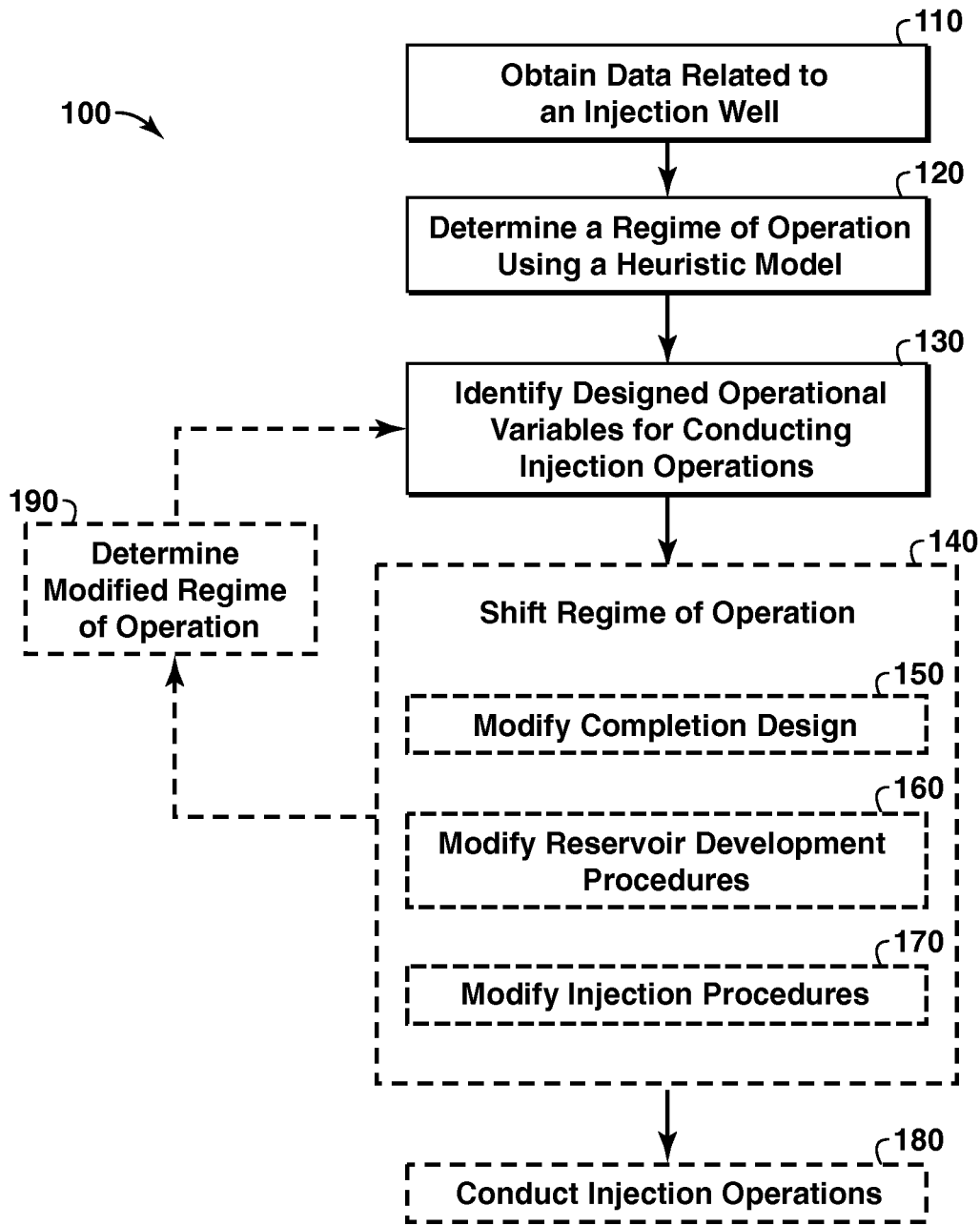
FIG. 1 is a flowchart showing steps that may be performed in connection with a fluid injection process.

As used herein, the term "full physics computational simulation" or "full physics simulation" refers to a mathematical algorithm in which substantially all of the first order processes that impact the pertinent response of the simulated system are included in the mathematical model of the simulated system. In the current context, the simulated system is a high rate injection into a rock formation.

As used herein, the term "heuristic model" means a model wherein a set of existing data points is collected and categorized so as to provide a reference by which future data points can be categorized. The existing data points may be collected from field data, may be derived from mathematical simulations, or combinations thereof. Likewise, the future data points may be collected from field data, may be derived from mathematical simulations, or combinations thereof.

The term "injection well" refers to any well that extends into a subsurface formation for the purpose of delivering a fluid into the formation. The well may be an existing well or a planned well in the design phase. Moreover, an existing production well may be temporarily, such as for stimulation or other treatment operations, or substantially permanently converted to an injection well. The fluid may be, for example, an aqueous solution such as brine. The aqueous solution may have solids forming a slurry. Solids may include cuttings from a drilling process. The aqueous solution may also include chemical viscosifiers, residual hydrocarbon fluids, or particulate matter.

The term "regime of operation" refers to the response of a formation to fluid injection. Examples include a formation fracture regime, a matrix injection regime or a formation fluidization regime.

The term "formation fluidization" means that the mechanical deformation of a targeted subsurface formation during injection operations is not correctly described by linear elastic fracture mechanics ("LEFM"). Formation fluidization refers to any one of various non-linear physical processes that may cause the LEFM to be an inaccurate or inappropriate description of the fracturing behavior.

As used herein, the term "subsurface formation" refers to any geologic strata occurring below the earth's surface. The subsurface formation may be a porous media such as a well-cemented sandstone, or weakly or uncemented sands. The subsurface formation may alternatively be, for example, a compacted clay material such as shale. Any of such materials may be generically referred to herein as "rock" although some consider uncemented sands to simply be "sand."

As used herein, the term "formation" refers to any finite subsurface region. The formation may contain one or more hydrocarbon-containing layers, one or more non-hydrocarbon containing layers, an overburden, and/or an underburden of any subsurface geologic formation. An "overburden" and/or an "underburden" means geological material above or below the formation of interest. An overburden or underburden may include one or more different types of substantially impermeable materials. For example, overburden and/or underburden may include rock, shale, mudstone, or wet/tight carbonate (i.e., an impermeable carbonate without hydrocarbons). An overburden and/or an underburden may include a hydrocarbon-containing layer that is relatively impermeable. In some cases, the overburden and/or underburden may include one or more permeable zones that are not targeted for injection or production related to a current development.

As used herein, the term "oil" refers to a hydrocarbon fluid containing a mixture of condensable hydrocarbons.

The term "operational variables" means completion designs, reservoir development procedures, injection procedures, or other variables that affect injectivity of a fluid into an injection well.

DESCRIPTION OF SELECTED SPECIFIC EMBODIMENTS

Methods for injecting a fluid into an injection well are disclosed herein. For simplicity, the injection well may be generically referred to herein as a "water injection well." However, it is understood that the methods and techniques claimed herein have application to the injection of any fluid. Such fluids may include an aqueous solution such as water or brine, a gas used for enhanced oil recovery procedures, or any other liquid or gas being injected for sequestration. Additionally or alternatively, the fluids may include liquids, slurries, and other compositions that may be used for stimulations or other treatments of wells. Accordingly, the term injection well refers to any well undergoing an injection operation.

FIG. 1 presents a flow chart setting forth steps that may be practiced in connection with methods 100 in some implementations of the present technology. The methods 100 include obtaining data related to an injection well. This step is indicated in box 110 of FIG. 1. The wellbore may be a dedicated wellbore completed as an injection well. Alternatively, the wellbore may be a converted production well or monitoring well. Still alternatively, the wellbore may be a production well being prepared for an injection operation. Additionally or alternatively, the obtained data may relate to a planned or proposed well that would be used for injection operations.

The obtained data includes an initial set of formation parameters related to a subsurface formation. The subsurface formation may be a weak-shear strength, uncemented formation, or a weakly cemented formation. Alternatively or in addition, the subsurface formation may have a high degree of compressibility. The formation may be a rock formation or a sand. The initial set of parameters may include, for example, the permeability of the rock formation, the vertical thickness of the rock formation, the geomechanical properties of the rock formation, the geological state of stress in the subsurface rock formation, formation pore pressure, or combinations thereof. A more comprehensive list of potential formation parameters is outlined and discussed below.

The obtained data also includes an initial set of operational variables related to the injection well, whether existing or planned. For example, the initial set of operational variables may include data regarding the planned or existing completion, the injection procedures, and/or the reservoir development procedures. As an initial example, the operational variables may include data regarding the fluid injection rate and the fluid viscosity. A more comprehensive list of potential operational variables is provided below.

The methods 100 also include determining a regime of operation for the fluid injection well. This step is indicated at box 120 of FIG. 1. The regime of operation is determined using a heuristic model. The heuristic model presents data points correlated to various regimes of operation. These regimes preferably include a formation fluidization regime, a formation fracture regime, and a matrix injection regime. Thus, the step 120 of determining a regime of operation may comprise inputting the initial set of formation parameters and the set of operational variables for the injection well into the heuristic model to generate an initial data point, and then determining whether the data point falls within the formation fluidization regime, the formation fracture regime, or the matrix injection regime.

As illustrated in FIG. 1, the methods 100 include identifying designed operational variables for conducting injection operations. This step is shown at box 130 in FIG. 1. In some implementations, the designed operational variables may be the same as the initial set of operational variables. In other implementations, the designed operational variables may be selected to shift the regime of operation from one regime to another or within a particular regime. As an initial example, the determined regime of operation using the initial set of obtained data may reveal that the injection well would operate as desired. Accordingly, no change to the operational variables would be necessary. Additionally or alternatively, in the event that the determined regime of operation could be theoretically improved upon by changing one or more operational variables, the economic and/or procedural realities may render such changes undesirable. In still other implementations, one or more of the operational variables may be changed in response to the determined regime of operation, which change may result in a shift from one regime to another.

While the heuristic models will be described in greater detail below, a brief introduction is provided here to facilitate understanding. A heuristic model generally refers to a model wherein data points are collected and categorized. The data points may be collected from field data, may be derived from mathematical simulations, or combinations thereof. The data in the model forms a database or reference by which future data points can be categorized. In the present applications, the heuristic model preferably indicates whether the regime of operation is in a formation fluidization regime, a formation fracture regime, or a matrix injection regime. Thus, data points used to create the heuristic model are correlated to one of these three regimes. In one aspect, the heuristic model constructs a mathematical model that can estimate the operating regime for an injection well. The mathematical model may be constructed from full physics computational simulations of injection and/or from field data. A full physics computational model means that a substantial portion of the first-order processes that impact the response of the simulated system are included in the mathematical model of the simulated system. This preferably means both fluid flow characteristics and geomechanical characteristics. In any instance, the heuristic model is utilized to determine the regime of operation for the obtained data.

As indicated above, some implementations of the methods 100 may include shifting the regime of operation, such as shown in FIG. 1 at box 140. The regime of operation may be shifted by modifying one or more operational variables. Modifying operational variables may include modifying a completion design for the injection well (box 150), modifying reservoir development procedures (box 160), modifying injection procedures (box 170), or combinations thereof. In some implementations, the modified operational procedures may be implemented in conducting injection operations. Data may be collected during the operations and the data may be entered in a heuristic model to determine a modified regime of operation. Additionally or alternatively, the modified operational variables may be entered into a simulation to generate data for use in the heuristic model. For example, the designed operational variables may be input into a computer simulation to model the injection performance, such as injection rate, pressure, etc. The data collected from the simulation may then be used to predict the regime of operation should the designed operational variables be implemented in an injection operation. The steps of determining a regime of operation using a heuristic model may be repeated when the designed operational variables are intended to shift the regime of operation or may be repeated when one or more of the operational variables are modified for other purposes. For example, determining a modified regime of operation may be desired when the designed operational variables differ from the initial set of operational variables, whether the variables have been modified with an intent to change the regime of operation or for other reasons, such as changing formation parameters, changing business drivers, etc.

Modifying operational variables to shift the regime of operation is an optional step depending on the regime of operation initially determined for the injection well. The regime of operation may be shifted, for example, from a formation fluidization regime or a matrix injection regime to a formation fracture regime. In one instance, the heuristic model may indicate that the regime of operation is in a formation fracture regime. In this instance, an operator or analyst may determine that operational variables do not need to be modified to shift the regime of operation. Alternatively, the operator may determine that, due to economic constraints or governmental regulations, operating procedures should not be changed notwithstanding a less than favorable regime of operation.

As noted, modifying operating procedures may also include modifying the completion design. This too is an optional step depending on the regime of operation initially determined for the injection well. This step is indicated at box 150 of FIG. 1. Modifying the completion design may include modifying surface facilities such as by (i) providing equipment to heat or cool the injected fluids, (ii) providing equipment to add viscosity modifiers to the injected fluid, or (iii) providing equipment to pump the injected fluid at an increased rate or pressure. Modifying the completion design may also include modifying downhole equipment for the injection well.

Modifying operating procedures to shift the regime of operation may also include modifying reservoir development procedures. This optional step is shown at box 160. Modifying reservoir development procedures may include (i) modifying a reservoir depletion plan, (ii) modifying the location of the injection well, (iii) adding an additional injection well, (iv) modifying a drilling plan for the injection well, (v) reducing the pore pressure in the subsurface formation, or (vi) combinations thereof. Reducing pore pressure may comprise producing from the subsurface formation prior to operating the injection well.

As noted, modifying operating procedures to shift the regime of operation may include modifying injection procedures. This is an optional step, and is shown at box 170. Modifying injection procedures may include (i) modifying an injection rate for the fluid, (ii) modifying a viscosity of the fluid to be injected, (iii) modifying a temperature of the fluid to be injected, (iv) modifying a depth at which the fluid is injected, or (v) combinations thereof.

The methods 100 also include injecting fluid into a subsurface formation through the injection well. This step is provided at box 180. As described above, the injection operation may inject fluid into the subsurface formation for any of a variety of reasons. Moreover, the injection operation may be conducted in an existing well or in a well that is drilled, completed, and/or converted at a later date.

As described above, many factors can be considered when assessing the probable regime of operation for a particular injection well. Such factors may be related to the formation, to the well, and/or to the implementation of the injection operation. As it relates to the formation itself, a variety of formation parameters may affect the regime of operation, including for example:

the permeability of the rock matrix;
the vertical thickness of the rock formation;
the geomechanical material properties of the rock formation;
the formation pore pressure; and
the geological state of stress in the subsurface rock formation.

Additionally, the regime of operation may be affected by a variety of operational variables. As used herein, operational variables refers to one or more of the many operations that may be varied or controlled by an operator. For example, operational variables include elements related to the construction and completion of the well, the manner of conducting the injection operation, and the manner of developing the formation, reservoir, and/or field.

As described above, the term reservoir development procedures is used to encompass a variety of elements that may or may not be in the control of an operator. For example, modifying the reservoir development procedures may include modifying the location of the injection well in the field if the well is still in planning and design stages. Additionally or alternatively, the drilling plan may be modified. Still additionally or alternatively, additionally injection wells may be provided. Similarly, the reservoir depletion plan may be modified and/or the pore pressure in the subsurface formation may be modified, such as by producing from the well or adjacent wells prior to conducting the injection operations. As can be seen, some of the operational variables may influence and/or affect the formation parameters, such as the formation pore pressure. In this respect, even when the operational variables are unchanged the formation parameters may change over time. Accordingly, the regime of operation may be determined at various points during the life of a well or at various points in the projected life of a well (in the simulated well planning implementations).

Continuing to provide additional examples of operational variables that may be considered in determining the regime of operation and/or changed in efforts to modify the regime of operation, the completion design may affect the regime of operation. As used herein, completion design refers to the equipment install downhole and the surface equipment that is used to interact with the formation. For example, various downhole equipment, including casing, perforations, flow control devices, etc., may affect the injection operation and the regime of operation. Accordingly, one or more of these systems may be considered in identifying designed operational variables. Similarly, surface equipment may be provided and/or altered to affect the regime of operation. Exemplary surface equipment that may affect the regime of injection operations include equipment to regulate and/or modify the viscosity of the injection fluids, to regulate and/or modify the temperature of the injection fluids, and/or equipment to regulate and/or modify the injection rate, pressure, etc.

Further examples of operational variables that can affect the regime of injection operations include variables directly related to the injection procedures. For example, the designed operational variables may include identifying the viscosity, the temperature, the composition, the pressure, etc. of the injection fluids. Additionally or alternatively, the designed operational variables may alter or modify any one or more of these variables relative to the initial set of operational variables. As another non-limiting example, of injection operations that can be considered and/or changed, the depth at which the fluid is injected may affect the regime of operation, including the depth at which the fluid exits the injection tubing into the well annulus and/or the depth at which the wellbore wall (whether cased or open-hole) provides access to the formation. While various examples of operational variables have been identified in this and the preceding paragraphs, these are non-limiting examples merely to show the variety of manners in which the injection regime can be influenced and the multitude of factors that affect the injection operation.

The relationship and interaction of the above parameters can be highly complex. However, computational or numerical simulations can be constructed such that the physical parameters that impact the regime of operation for injection wells are together considered. In some implementations of the methods 100, the step 120 of identifying the regime of operation relies upon simulations. The above parameters may serve as inputs to mathematical expressions used in such a computations simulation. The mathematical expressions are used to create data points that are input into a heuristic model. In this way the heuristic model represents a set of data points correlated to various regimes of operation.

In one embodiment, data points are generated using full physics computational simulations of injection to construct a mathematical model that can estimate the operating regime for an injection well. Alternatively or in addition, the data points underlying the heuristic model may be generated based upon field data. In the current context, the simulated system is a high rate injection into a subsurface formation. The subsurface formation may be, for example, a weakly-cemented sandstone, a shale, or a sand. The formation may or may not have meaningful permeability.

In the methods 100, full physics computational simulations may be used to investigate the impact of various operational and geologic variables on an injection well's regime of operation. The full physics simulation may include both the nonlinear coupling between the mechanical deformation of the rock formation and the flow of fluid through the pore volumes of the rock formation. The separate nonlinear effects governing the deformation response and fluid flow response in the rock may also be considered. Specifically in the preferred embodiment, the computational method used to capture the discontinuity in the rock is generalized to capture the differences between fractures in strong, hard rock formations and the response seen in weak, more compliant formations. Optionally, the coupled, or inter-related, mathematical terms that capture the plugging of a rock formation during the propagation of a fracture through the rock are included in the model.

In order to create a model, a parametric study has been carried out with nonlinear, full-physics computational simulations to generate data on when an injection well would be estimated to operate under (1) the matrix injection regime; (2) the formation fracturing regime; or (3) the formation fluidization regime. Each point of data was a classification of the injector's operating mode for the given values of dimensionless variables used in the simulation.

Figure 2:
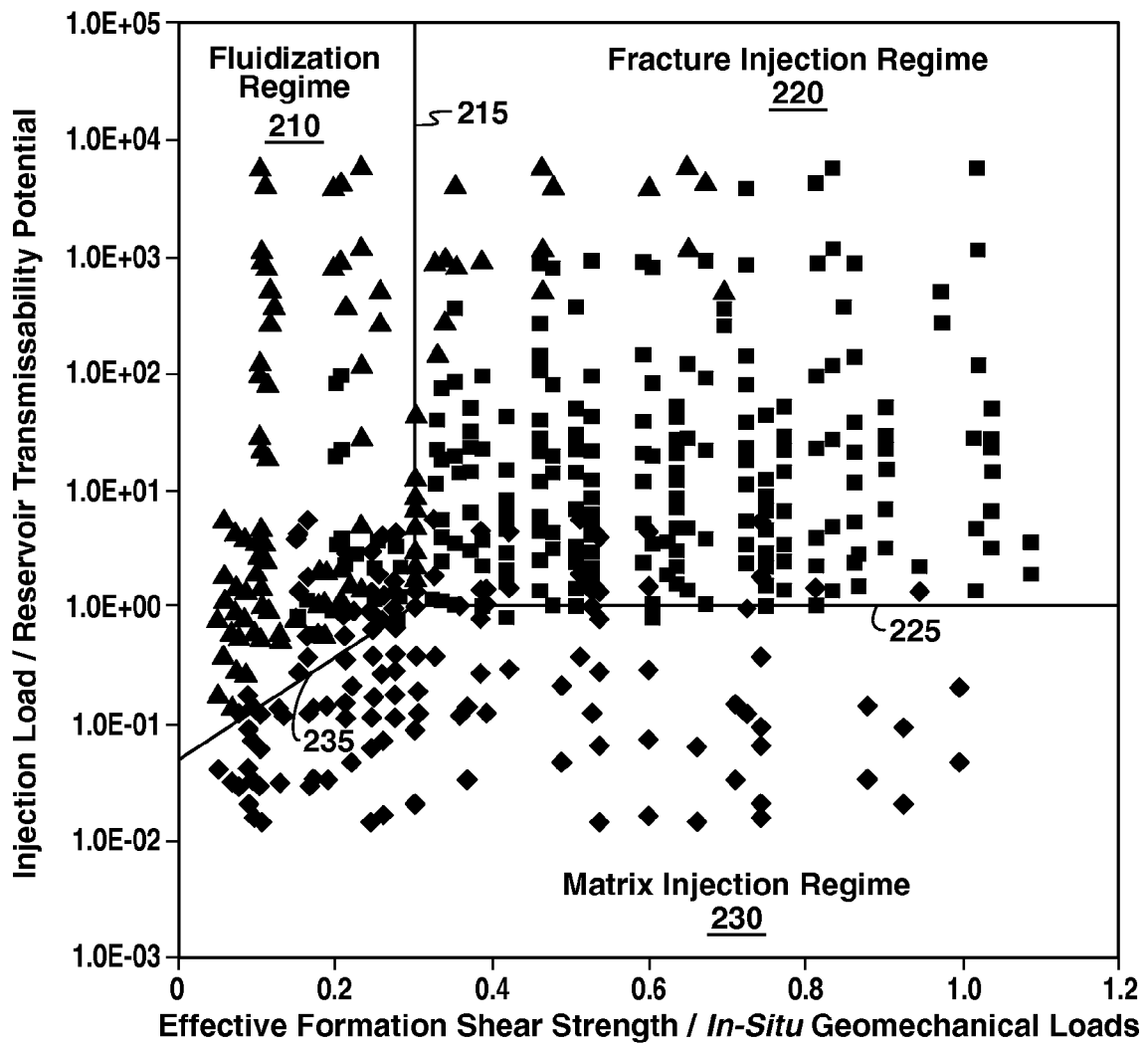
FIG. 2 is a graph representing a heuristic water injection regime model as may be constructed to determine a mode of injection for a water injection well. A large number of data points are shown representing the three different injection modes.

FIG. 2 presents a graph showing multiple points of data. The graph divides the data into the three regimes for a water injection well. A large number of data points are shown. The data points have been categorized, forming a heuristic water injection regime model.

First, the fluidization regime is shown. This regime is indicated at 210. Formation fluidization is likely when the rock formation has a weak shear strength, or when the rock formation is highly compressible. Formation fluidization may also occur when the formation is uncemented or unconsolidated. In this regime, the ratio of effective formation shear strength to in situ geomechanical stress is relatively low, while the ratio of injection load to formation transmissibility potential is relatively high.

Data points in the fluidization regime 210 are indicated by triangles. These data points are indicative of a formation which does not easily receive injected fluids. Such a subsurface formation may be, for example, a very high permeability sand. Because of the development of a relatively large process zone, the potential of the formation particles to undergo large strains, and the nonlinear changes in material properties at high flow rates, operation in the fluidization regime is typically much less effective than planned. In addition, the fluidization problem is exacerbated by plugging. At a certain rate the injector well is no longer able to fracture through the sand because the formation doesn't truly fracture and linear elastic fracture mechanics no longer apply. This is known because (a) the ratio of injection load to reservoir transmissibility is high, but (b) the ratio of effective formation shear strength to geomechanical stress is low. Stated another way, the simulations do not show LEFM-type fractures.

Second, the fracture injection regime is shown. This regime is indicated at 220. Formation fracturing is likely to occur when the rock formation has a relatively higher shear strength. Formation fracturing may also occur when the formation is consolidated, and the subsurface formation exhibits brittle fractures under LEFM theory. In this regime, the ratio of effective formation shear strength to in situ geomechanical stress is relatively high, while the ratio of injection load to formation transmissibility potential is also relatively high.

Data points in the fracture regime 220 are indicated by squares. These data points are indicative of a brittle fracture in the formation. This is indicated because (a) the ratio of injection load to reservoir transmissibility is high, and (b) the ratio of effective formation shear strength to geomechanical stress is also high.

Finally, the matrix injection regime is shown. This regime is indicated at 230. Matrix injection flow is generally not a function of shear strength, but is more a function of injection load and transmissibility potential. In this regime, the ratio of effective formation shear strength to in situ geomechanical stress may be relatively low or relatively high. However, the ratio of injection load to formation transmissibility potential remains relatively low.

Data points in the matrix injection regime 230 are indicated by diamonds. These data points are indicative of a formation that receives fluids through the pore spaces without creating fractures. This is indicated because the ratio of injection load to reservoir transmissibility is low. It is noted that if the simulation calculations take plugging into account, the reservoir transmissibility is reduced over time. This increase the ratio of injection load to reservoir transmissibility, forcing the data points upward.

In order to distinguish between the three injection regimes 210, 220, 230, lines may be placed on the model of FIG. 2. Line 215 is provided to differentiate between the formation fluidization regime 210 and the formation fracture regime 220. Line 225 is provided to differentiate between the formation fracture regime 220 and the matrix flow regime 230. Finally, line 235 is provided to differentiate between the formation fluidization regime 210 and the matrix flow regime 230. The lines 215, 225, 235 establish a heuristic regime model in response to an interpretation of the data points.

In FIG. 2, the heuristic model is used to categorize an injection well according to injection regime. The lines 215, 225, 235 of FIG. 2 are generally drawn in response to fluid injection responses indicated by the simulation. If a clear fracture is formed in the simulation, then the data point is reflected in the parametric study to be a part of the formation fracture regime 220. If no fracture forms but matrix flow is nevertheless indicated by a steady injection pressure, then the data point is found in the parametric study to be a part of the matrix injection regime 230. However, if no fracture (or only a very small fracture) is formed in the rock and plastic strain is indicated coupled with an abnormally high injection pressure, then the data point is indicated in the parametric study to be a part of the formation fluidization regime 210.

It is understood that while FIG. 2 shows lines 215, 225, 235 as being well-defined or crisp breaks between the three regimes 210, 220, 230, there may actually be transition zones where the injection behavior is some mix of two regimes. For example, line 215 may be replaced with a transition zone between the fluidization regime 210 and the fracture injection regime 220. Similarly, line 225 may be replaced with a transition zone between the fracture injection regime 220 and the matrix injection regime 230. Similarly still, line 235 may be replaced with a transition zone between the matrix injection regime 230 and the fluidization regime 210. Lines 215, 225, 235 are offered in FIG. 2 to aid in demonstrating in three dimensions the distinctions between the three injection regimes 210, 220, 230.

Figure 2A:
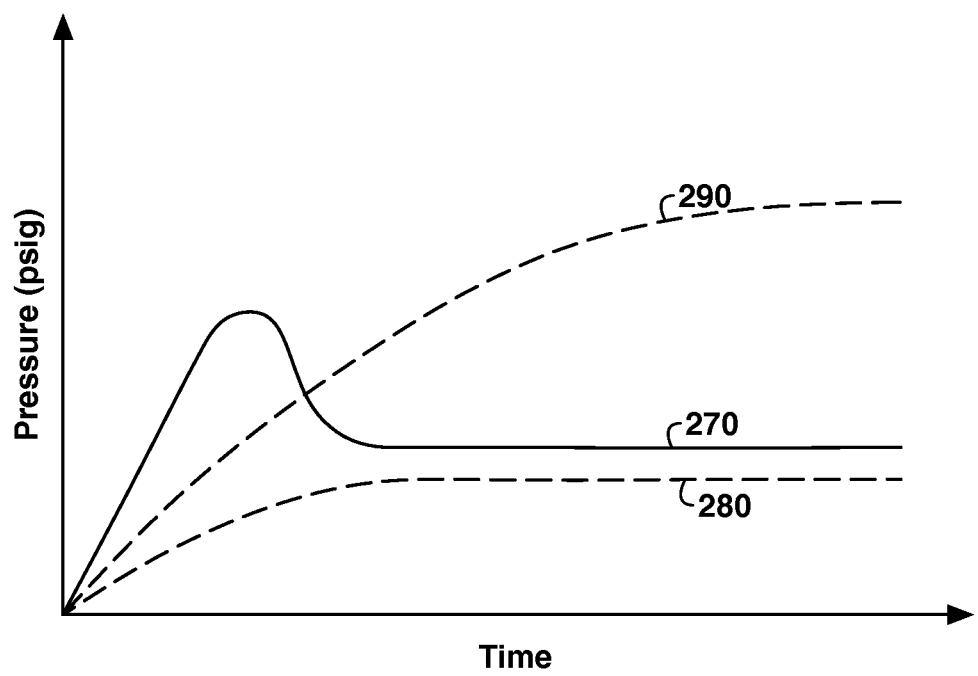
FIG. 2A is a Cartesian plot depicting wellhead pressure versus time. Three lines are shown forming a heuristic model. The lines separate areas representing a formation fracture flow regime, a matrix flow regime, and a formation fluidization regime.

An ancillary way of determining formation fluidization regime is by referring to a pressure vs. time plot. A pressure vs. time plot is shown in FIG. 2A In FIG. 2A, the "y" axis represents pressure at the wellhead (in psig), while the "x"-axis represents time (in minutes). Three lines are shown at 270, 280 and 290. Line 270 represents a formation fracture flow regime; line 280 represents a matrix injection regime, and line 290 is indicative of a formation fluidization regime.

It can be seen from FIG. 2A that for a formation fracture regime 270, wellhead pressure increases quickly in the formation, but then drops as fractures in the rock are established. For a matrix injection regime 280, pressure increases somewhat linearly over time and then levels to a steady state as flowpaths in the formation are established. The line for the matrix injection regime 280 levels off just below the line for the formation fracture regime 270. The formation fluidization regime 290 demonstrates an increase in pressure over time that is somewhat asymptotic. The line for the formation fluidization regime 290 levels off noticeably above the line for the formation fracture regime 270.

The lines 270, 280, 290 are derived from data points (not shown). The data points may be collected from field data, may be derived from mathematical simulations, or may be from combinations thereof. The data points are collected and categorized so as to provide a reference by which future data points can be categorized. Thus, the plot of FIG. 2A defines a second heuristic model.

Returning to FIG. 2, it can be seen that the dividing lines 215, 225, 235 are somewhat subjective. Placement of the lines 215, 225, 235 between the three regimes 210, 220, 230 involves some element of experience and engineering judgment. For instance, a reservoir engineer may choose to take line 215, which is generally vertical, and create a curve indicating an increasing "x" value at the highest "y" values. This is because formation fluidization 210 is more likely when the injection load is very high or when the reservoir transmissibility potential is very low.

Once all of the data points are plotted in the dimensionless parameter space, mathematical expressions may be derived that estimate the boundaries between the three modes of operation 210, 220, 230 for injection wells.

It is noted that nonlinear plastic behavior can be mathematically detected. In most rock formations, a Cartesian coordinate can be created indicating stress ($\sigma$) versus strain ($\epsilon$). Stress, or "$\sigma$," is defined by applied force divided by the area over which the force acts. Strain, or "$\epsilon$," is a unitless value defined by a change in length in response to a load over original length.

The relationship between "$\sigma$" and "$\epsilon$" is typically linear, with the slope of the line defining the modulus of elasticity (E) of the rock. Combining the constant modulus of elasticity with a constant Poisson's ratio (v) defines linear elastic material behavior. Calculations may be done to determine how quickly a fracture will grow in the rock. However, if the relationship between "$\sigma$" and "$\epsilon$" deviates from "E," then nonlinear plastic behavior is indicated. In this instance, fracture formation cannot be predicted and, in fact, may never occur.

It is added here that linear elastic fracture mechanics is based on the leading order behavior of a very small, nonlinear region at the crack tip. This means that LEFM includes nonlinear plastic behavior, but such is limited to a very small zone at the crack tip. A problem is encountered when the plastic region at the tip is not small relative to the crack tip. In this instance, nonlinear plastic behavior is taking place and LEFM principles do not accurately describe the fracture process.

Nonlinear plastic behavior is most commonly experienced in weakly compacted clay or sandstone formations where the particles are either weakly cemented together or completely uncemented. However, it is possible to have a well cemented rock with very high permeability that demonstrates nonlinear plastic behavior.

Preferably, a large number of input parameters, including formation parameters and operational variables, are present in the nonlinear system of equations used to model the full physics response of subsurface rock formations subject to the injection of water.

Dimensional analysis may be utilized to limit both the range of values for any particular input parameter to be studied in the computational simulations, and the number of permutations of input parameters that need to be considered. In one aspect, the rock formation parameters and operational variables that may be adjusted in the computational simulations include:
- the injection rate;
- the specific gravity of the injected fluid;
- the viscosity of the injected fluid;
- the temperature of the injected fluid;
- the height and permeability of the rock formation;
- the porosity of the rock formation;
- the elastic modulus of the rock formation;
- the fracture toughness of the rock formation;
- the in-situ effective stresses in the formation; and
- the unconfined compressive strength ("UCS") of the rock formation; and
- the friction angle of the rock formation.

Other input parameters may also be included.

The heuristic injection regime model uses the following mathematical computations:

Input Values for "x" Coordinate
  E=Elastic modulus of the rock (psi/kPa)
  UCS=Uniaxial Compressive Strength of rock (psi/kPa)
  β=Friction angle of the rock (degrees)
  $S_v$=Formation overburden stress (psi/kPa)
  $S_H$=Formation maximum horizontal stress (psi/kPa)
  $S_h$=Formation minimum horizontal stress (psi/kPa)
  dS/dθ=Change in formation horizontal stress per degree temperature change
  PP=Pore pressure (psi or kPa)
  $\theta_{fluid}$=Temperature of injected fluid (degrees F./C.)
  $\theta_{rock}$=Temperature of formation (degrees F./C.)

Derived Values for "x" Coordinate
  $\Delta S^\theta$=Thermal stress reduction for cold water injection [dS/dθ×($\theta_{rock}-\theta_{fluid}$)]
  $\sigma_v$=Effective overburden stress ($S_v$-PP) (psi/kPa)
  $\sigma_H$=Effective maximum horizontal stress ($S_H$-PP-$\Delta S^\theta$) (psi/kPa)
  $\sigma_h$=Effective minimum horizontal stress ($S_h$-PP-$\Delta S^\theta$) (psi/kPa)
  MES=Mean effective stress ($\sigma_v+\sigma_H+\sigma_h$)/3.0 (psi/kPa)
  S'=MES×tan(β)+[1-tan(β)/3]×UCS (psi/kPa)
  "x" Position on Injection Regime=S'/minimum principal stress
  Minimum principal stress is the lesser of $S_h$ or $S_v$. This is typically $S_h$ but may, in some cases, be $S_v$ Input Values for "v" Coordinate
  Q=Injection rate (bbl/day or m³ per day)
  E=Elastic modulus of the rock (psi/kPa)
  $S_h$=Formation minimum horizontal stress (psi/kPa)
  K=Formation permeability (mDarcy)
  H=Formation thickness or height TVD (feet or meters)=
  μ=Injected fluid viscosity (cp)
  "y" Position on Injection Regime=[Q×E/minimum principal stress]/(K×H)/μ
  Minimum principal stress is the lesser of $S_h$ or $S_v$.

Units are provided where applicable for each of the above input values. It is understood that these units are merely illustrative. Values must be dimensionally consistent for the axes to be dimensionless.

Figure 3:
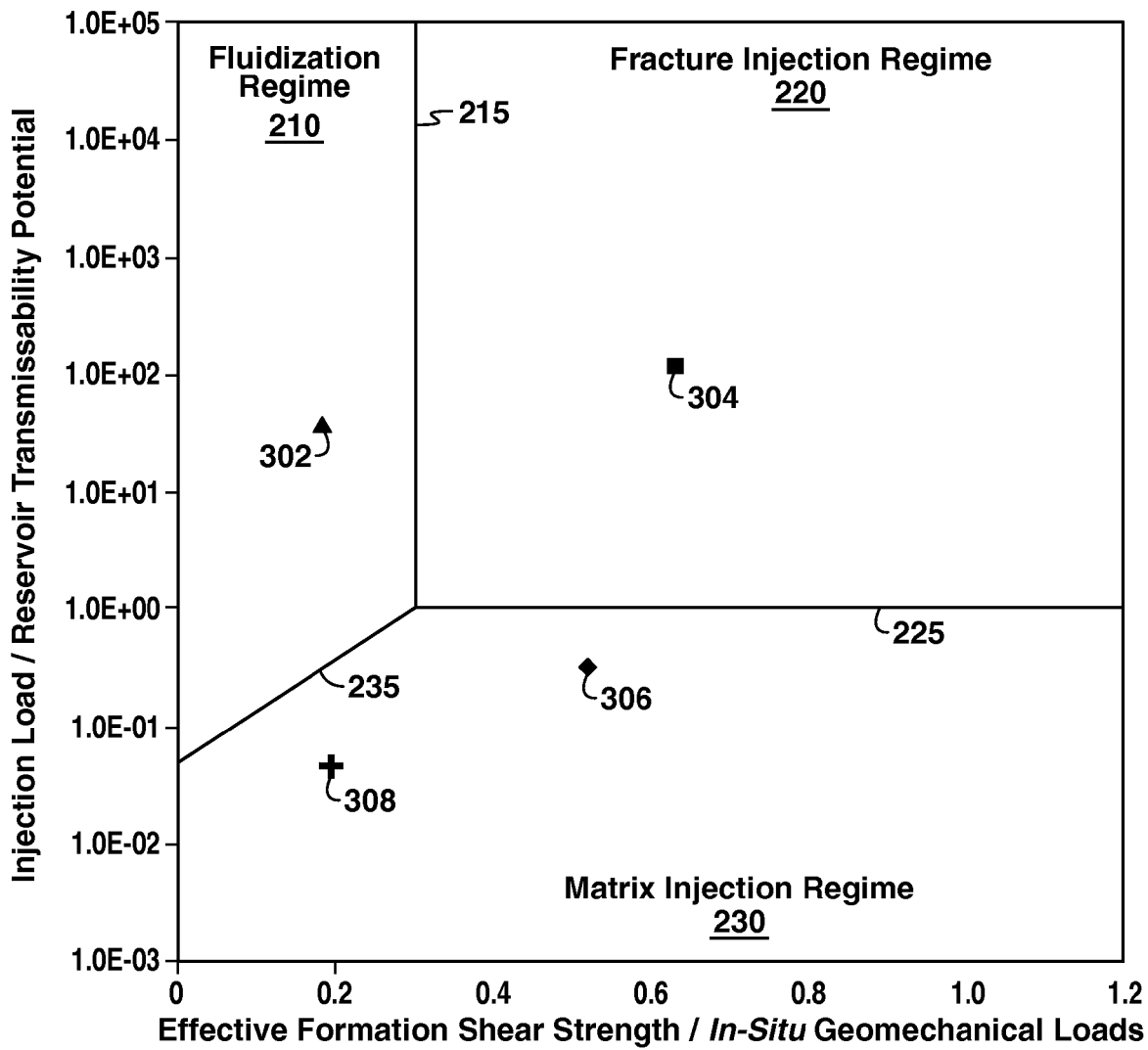
FIG. 3 is the heuristic water injection regime model of FIG. 2 applied to specific data points. The data points were used to classify regimes of injection in the injection model.

Applying the formulas above to specific data allows a user to plot points on the heuristic regime model. FIG. 3 presents the heuristic injection regime model used to estimate the operating regime (e.g., matrix injection, fracturing or fluidization) of injection wells based upon input of the above parameters. The heuristic injection regime model permits the user to visually identify which of the three modes of operation is likely to prevail in an injection process.

First, as noted above the regime model generally calculates the ratio of the formation's effective shear strength to the in-situ geomechanical loads. These values are defined along the "x" axis. The ratio of the formation's effective shear strength to the in situ geomechanical load is mathematically defined as: S'/minimum principal stress Minimum principal stress is typically minimum horizontal stress $S_h$, but may, in some cases, be the vertical stress $S_v$.

In FIG. 3, "x" axis values run from 0 to 1.2. Formation shear strength can be calculated from data derived from laboratory experiments on core samples. Alternatively, geophysical log data can be taken, and empirical correlations made from the geophysical log data to arrive at an estimated shear strength.

Geomechanical loads, that is, the forces acting on the rock, may be calculated from a variety of data. Such data includes leak-off tests and geophysical log data. Drilling records can also indicate formation strength. In this respect, if the operating pressure causes a loss of circulation, this is an indication of formation fracture pressure. This, in turn, is a measure of geomechanical load, including minimum principal stress ($S_h$ or $S_v$).

Second, and as noted above, the regime model calculates the ratio of the hydraulic load (or "injection load") placed on the rock formation to the formation's transmissibility potential. Hydraulic load is related to the amount of fluid the operator is trying to inject into the formation during fluid injection. Hydraulic load may be calculated using information about the injection operations. This includes injection rates and the viscosity of the fluid being pumped into the rock formation. Formation transmissibility potential is a measure of the ability of the rock formation to conduct or transmit the injected fluid away from the near wellbore region. Formation transmissibility potential is a factor of the rock's permeability. Transmissibility potential is also a function of the matrix porosity, the size of the formation (that is, its height), its compressibility, and the nature of the fluid (that is, gas versus liquid). Formation transmissibility potential can be calculated from well log data, from experimental test data conducted on core plugs, or from well test data.

The ratio values for the hydraulic load placed on the rock formation to the formation's transmissibility potential are placed on the "y" axis. In one aspect these values run from $1\times10^{-3}$ to $1.0\times10^5$. This range may be different for other simulations. For example, a simulation based on a viscosified gel rather than water may produce a different parameter range.

By plotting the points and creating lines 215, 225, 235, an operator may use the injection regime model to estimate the operating regime of a given injection well based upon input of the above parameters. The heuristic injection regime model permits the user to visually identify which of the three modes of operation is likely to prevail in an injection process, that is, fluidization 210, fracturing 220, or matrix injection 230.

In FIG. 3, four discrete data points are indicated. These are:
  Triangle (▲) 302;
  Square (■) 304;
  Diamond (♦) 306; and
  Star (+) 308.

The data points 302, 304, 306, 308 represent various high rate injection operation conditions that were modeled in the simulation step of Box 120. Such conditions reflect various operational variables and formation parameters, such as injection rate, fluid viscosity, and rock properties. The operational variables and formation parameters are indicated in Table 1, below:

TABLE 1

| Well or Field | Injection Rate (bpd) | Fluid Viscosity (cp) | Formation Thickness (feet) | Elastic Modulus (psi) | Poissons Ratio | Formation UCS (psi) | Formation Friction Angle (degrees) | Formation Permeability (mDarcy) | Formation Overburden $\sigma_v$ (psi) | Total Values Formation Stress $\sigma_H$ (psi) | Formation Stress $\sigma_h$ (psi) | Formation Pore Pressure (psi) |
|---|---|---|---|---|---|---|---|---|---|---|---|---|
| ▲ 302 | 18,000 | 1.200 | 250 | 7.000E+05 | 0.320 | 250 | 35 | 2.50E+03 | 5,350 | 4,850 | 4,500 | 4,000 |
| ■ 304 | 14,500 | 0.900 | 250 | 1.500E+06 | 0.320 | 2,000 | 35 | 5.00E+02 | 7,100 | 4,850 | 4,400 | 3,700 |
| ♦ 306 | 1,000 | 0.500 | 500 | 9.000E+05 | 0.320 | 1,500 | 43 | 2.30E+03 | 6,850 | 5,100 | 5,000 | 4,000 |
| + 308 | 5,500 | 0.005 | 250 | 7.00E+05 | 0.320 | 250 | 35 | 2.50E+03 | 5,350 | 4,850 | 4,500 | 4,000 |

It can be seen that the triangle (▲) 302 is located in the fluidization regime 210; the square (■) 304 is located within the fracture injection regime 220; the diamond (♦) 306 is located within the matrix injection regime 230; and the star (+) 308 is also located within the matrix injection regime 230 but in a position lower in the graph. Thus, the heuristic model provides the operator with a ready visual method for determining the injection regime.

It is noted that many water injectors in weak or unconsolidated formations are estimated by the model to operate in the formation fluidization regime. This is due to the highly compressible, uncemented nature of the rock. The formation fluidization phenomenon has also been observed in 'deep water' formations where such formations have demonstrated problems with compressibility/fluidization. In the formation fluidization mode of operation, an injection well's injection capacity is likely to be sub-optimal. Therefore, it is desirable to determine what operational variables may be adjusted that will change the operating mode of the formation. This step is shown at Box 140 in FIG. 1.

It can be seen that in the injection regime model of FIG. 2 and FIG. 3, the formation fluidization regime 210 is to the left of the formation fracture regime 220. Therefore, one embodiment of the invention is to use the injection regime map model to determine which operational variables can be manipulated to shift an injection well's operating mode from the formation fluidization regime 210 to the fracture regime 220. In the context of FIG. 3, it can be seen that triangle 302 resides solidly in the fluidization regime 210. Star 308 and diamond 306 reside in the matrix injection regime 230, while square 304 resides within the formation fracture regime 220. Therefore, under step 140 it is desirable to adjust the operating chanical loads, while the "y" axis represents the ratio of the hydraulic load (or "injection load") placed on the subsurface formation to the formation's transmissibility potential in accordance with the formulas above. However, in FIG. 4 the operational variables for injector well 302 have been adjusted.

Figure 4:
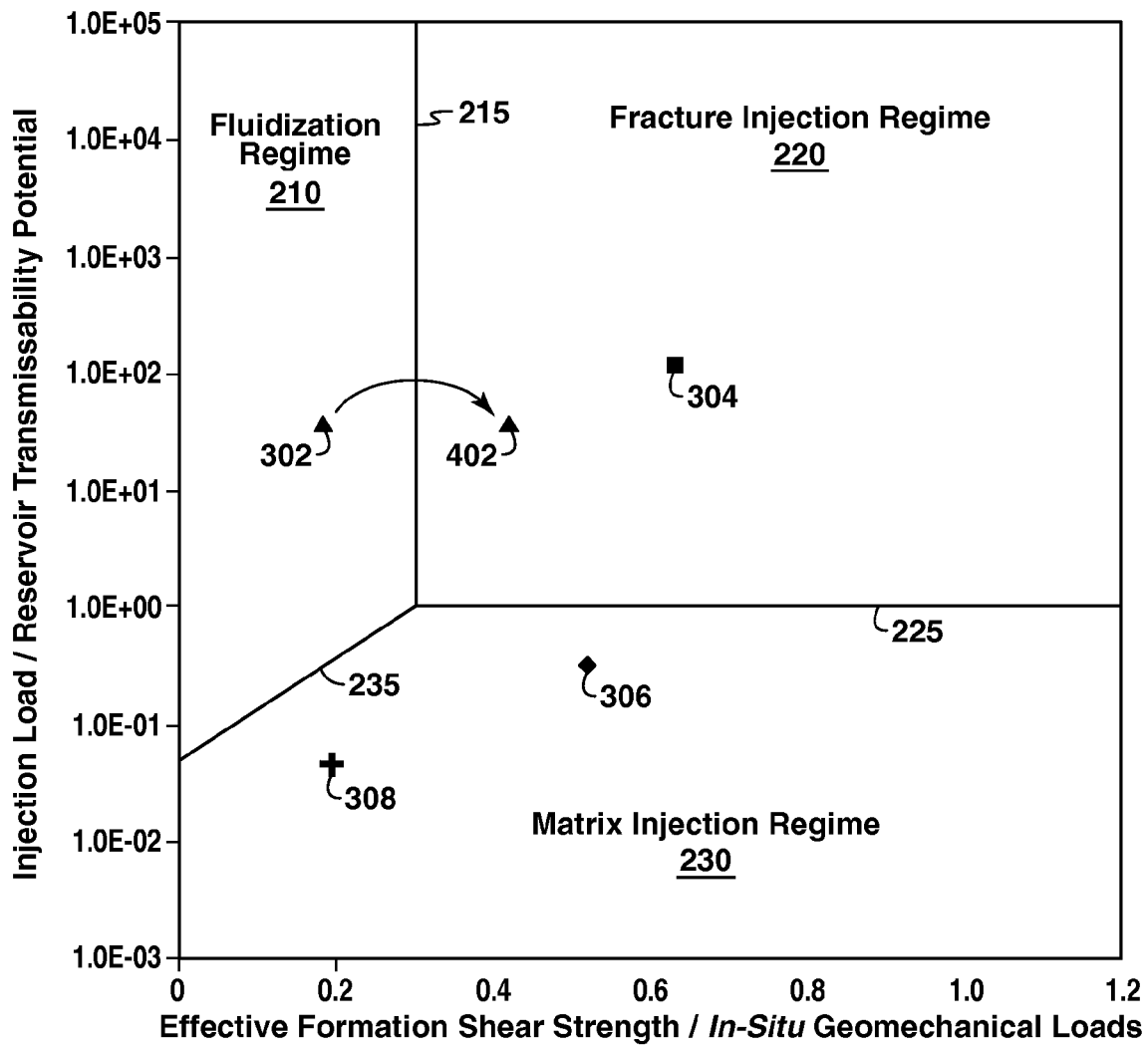
FIG. 4 is the graph of FIG. 3. However, one of the four data points has been changed in response to a modification of an input parameter for the model.

In FIG. 4, five data points are again indicated:
Triangle (▲) 302
Square (■) 304
Diamond (♦) 306;
Star (+) 308; and
Triangle (▲) 402

These data points 302, 304, 306, 308, 402 once again represent various high rate injection operation conditions that were modeled in the adjusted simulation step of Box 190. Such conditions reflect various operational variables and formation parameters, such as injection rate, viscosity, and rock properties, as outlined above. The data points 302, 304, 306, 308 represent the same input values as listed in Table 1. As a result, the data points 302, 304, 306, 308 fall on the same positions in FIG. 4 as in FIG. 3. In this respect, the triangle (▲) 302 is located in the fluidization regime 210; the square (■) 304 is located within the fracture injection regime 220; and the diamond (♦) 306 and the star (+) 308 are located within the matrix injection regime 230. However, data point 402 representing the triangle (▲) falls in a different position in FIG. 4 as the triangle (▲) 302 in FIG. 3. In FIG. 3, data point (▲) 302 fell in the fluidization regime 210, while in FIG. 4 data point (▲) 402 falls in the fracture injection regime 220.

In order to make this adjustment, the following operations variables and formation parameters were used:

TABLE 2

| Well or Field | Injection Rate (bpd) | Fluid Viscosity (cp) | Formation Thickness (feet) | Elastic Modulus (psi) | Poissons Ratio | Formation UCS (psi) | Formation Friction Angle (degrees) | Formation Permeability (mDarcy) | Formation Overburden $\sigma_v$ (psi) | Total Values Formation Stress $\sigma_H$ (psi) | Formation Stress $\sigma_h$ (psi) | Formation Pore Pressure (psi) |
|---|---|---|---|---|---|---|---|---|---|---|---|---|
| ▲ 302 | 18,000 | 1.200 | 250 | 7.000E+05 | 0.320 | 250 | 35 | 2.50E+03 | 5,350 | 4,850 | 4,500 | 4,000 |
| ▲ 402 | 18,000 | 1.200 | 250 | 7.00E+05 | 0.320 | 250 | 35 | 2.50E+03 | 5,350 | 4,850 | 4,500 | 2,400 | conditions to shift the triangle 302 from the fluidization regime 210 over to the fracture injection regime 220.

FIG. 4 provides a map model representing "x" and "y" coordinates in the same heuristic model. The graph of FIG. 4 uses the same "x" and "y" parameters as the graph of FIG. 3. This means that the "x" axis generally represents the ratio of the formation's effective shear strength to the in-situ geome- It can be seen from Table 2 that the formation pore pressure in the formation has been reduced from 4,000 psi to 2,400 psi. In practice, this may be done by allowing the pore pressure in the formation to deplete, or be reduced, from its initial value. This may be done, for example, by producing the reservoir for a period of time until the reservoir pressure has been drawn down to a designated level. This, in turn, allows more confining stress to develop in the rock, thereby reducing the likelihood of fluidization.

As a result of modifying the formation pore pressure for the injector well (▲) 302 in FIG. 3, the data point for the triangle (▲) 402 in FIG. 4 has moved to the right. This means that the triangle data point (▲) has moved out of the fluidization regime 210 and into the fracture injection regime 220. This is viewed as a positive development for maintaining high injectivity for the water injection well (▲).

From a computational standpoint, reducing the pore pressure causes the effective stress values $\sigma_v$, $\sigma_H$, $\sigma_h$ to be increased. This, in turn, increases the mean effective stress ("MES"). Increasing the MES causes the S' value to be increased, which moves the data point further to the right along the "x" coordinate.

As noted above, water injectors in highly compressible, weakly- or un-cemented rock formations are often observed to operate in the formation fluidization regime where their ability to maintain a high value of injectivity is suspect. If water injectors in a field undergoing secondary recover operations suffer a decline in injectivity ("II"), it is likely that hydrocarbon recovery performance in the reservoir will be suboptimal. This may be due to a resulting lack of sweep and the absence of the desired maintenance in reservoir pressure from water injection. In the preferred embodiment of the invention, the injection regime map model and the computational simulations are used to identify injector completion designs and operating procedures that reduce the risk that an injection well will operate in the formation fluidization regime.

In the present methods 100, knowledge of the probable mode of operation for an injection well is an important consideration when later selecting the well completion design and operating procedures for the injection well. Such knowledge can also have an impact on facilities design. For example, if the operator knows that he or she is operating in a fluidization regime, they will need to provide much larger pump pressures to obtain injectivity. Similarly, if the operator knows that he or she is in an injection matrix regime, he or she will need to be careful in selecting and implementing tight filtration specifications. If the operator knows that he or she is in a fracture regime, he or she can design or employ injection pumps at the fracture pressure, and can reduce filtration requirements. Therefore, a step in the methods 100 may be to determine or identify designed operational variables, as discussed above and represented in FIG. 1 by box 130.

In the parametric study mentioned above, it was determined that reducing reservoir pressure in a weakly consolidated formation can shift the operating mode in the regime model. This being the case, one aspect of the methods 100 is to produce the reservoir for a period of time until the reservoir pressure has been reduced to a designated level. According to methods 100, a step of optionally producing from the subsurface formation from one or more production wells is practiced. This may be determined as part of step 130.

A question arises as to what amount of reservoir pressure depletion may be desired. The heuristic injection regime model can be used to estimate the level of reservoir depletion needed so that the resulting increase in effective formation shear strength increases, thereby shifting the operating condition of one or more water injectors out of the formation fluidization regime. With this information, the operator of a field can then produce hydrocarbon fluids and water from the formation for a period of time.

Once the reservoir has been sufficiently depleted to the determined pressure so that injection does not result in "fluidized" behavior," one or more water injection wells may be drilled and completed. Water may then be injected. This is indicated at Box 180 of FIG. 1.

An alternate embodiment of the invention is to initially use one or more injection wells as producers. This means that the injection wells are drilled and initially completed as producers. After the reservoir has been sufficiently depleted so that injection does not result in "fluidized behavior," one or more production wells is reworked to serve as an injection well. This practice helps to ensure that the near-wellbore rock formation is partially depleted when injection operations commence.

Based on the regime of operation that is determined, an operations procedure for high injectivity is set forth. Stated another way, the present invention also addresses well completion design methodologies and operational procedures for high injectivity water injection into weak shear strength, uncemented, highly compressible rock formations. Armed with the knowledge of which injection regime map variables need to be changed, an appropriate completion design and optimal operating procedures can be selected for injection wells in highly compressible, uncemented rock formations to effect these changes.

For example, in order to maintain and maximize the connectivity between an injection well and a surrounding rock formation, a possible completion technique is to pump resin-coated proppant under high pressure into the rock formation. This completion technique should create a large fracture/void extending outward from the wellbore and fill the volume of this fracture/void with highly permeable material. The resin coating on the proppant may serve to stabilize the proppant pack and to prevent it from being disrupted by subsequent extreme fluid flow conditions during pressure transients in the injector.

In support of the present inventions, full physics computational simulations have been conducted to assess the ability of the "produce first, inject second" operational concept to shift an injection well's operating mode from a formation fluidization regime to a formation fracture regime. A simulation was first constructed for an injection well with the following conditions:
 an injection rate of 40,000 barrels per day ("bpd");
 a specific gravity of the injected fluid of 1.02;
 a viscosity of the injected fluid of 0.5 cp;
 a formation thickness of 62 meters;
 a permeability of the rock formation of 1.5 Darcy;
 a porosity of the rock formation of 25%;
 a formation pore pressure of 4,120 psi;
 an elastic modulus of the rock formation of 275,000 psi;
 a minimum effective horizontal stress of 986 psi; and
 a UCS of the rock formation of ~200 psi.

Figure 5:
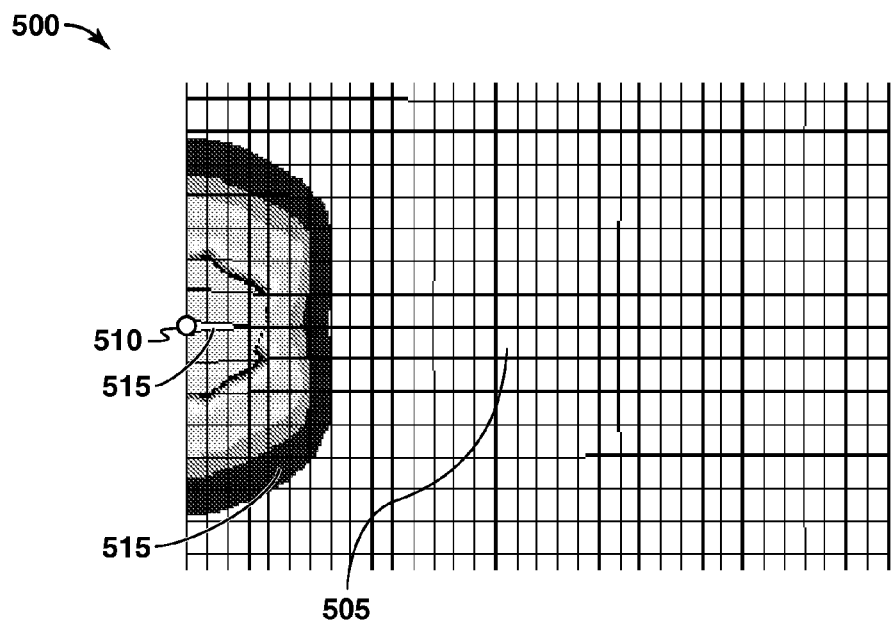
FIG. 5 represents a full physics simulation of injection into a weak, uncemented rock formation. The well was initially completed as an injection well.

FIG. 5 represents a full physics simulation 500 of high rate injection into a weak, uncemented subsurface formation 505. "High rate" in this simulation 500 refers to 40,000 bbl/day. In this simulation 500, a well is indicated at 510. The well 510 is seen in plan view. The well 510 was not used as a producer first; instead, the injection rate was applied through the well 510 immediately. The injection was started with the pore pressure in the formation at the initial magnitude, that is, 4,120 psi.

The response of the formation 505 is shown in FIG. 5. Contours are indicated at 520 around the well 510 as a half-symmetry domain. The contours 520 reflect plastic strain acting on a formation downhole. In FIG. 5, the contours 520 around the well 510 show a large amount of plastic strain. The injection fluid has created only a very short fracture 515 in the subsurface formation. Nonlinear deformation of the rock further weakens the formation 505 and precludes the fracture 515 from propagating very far. A highly localized plastic zone is not maintained.

Figure 6:
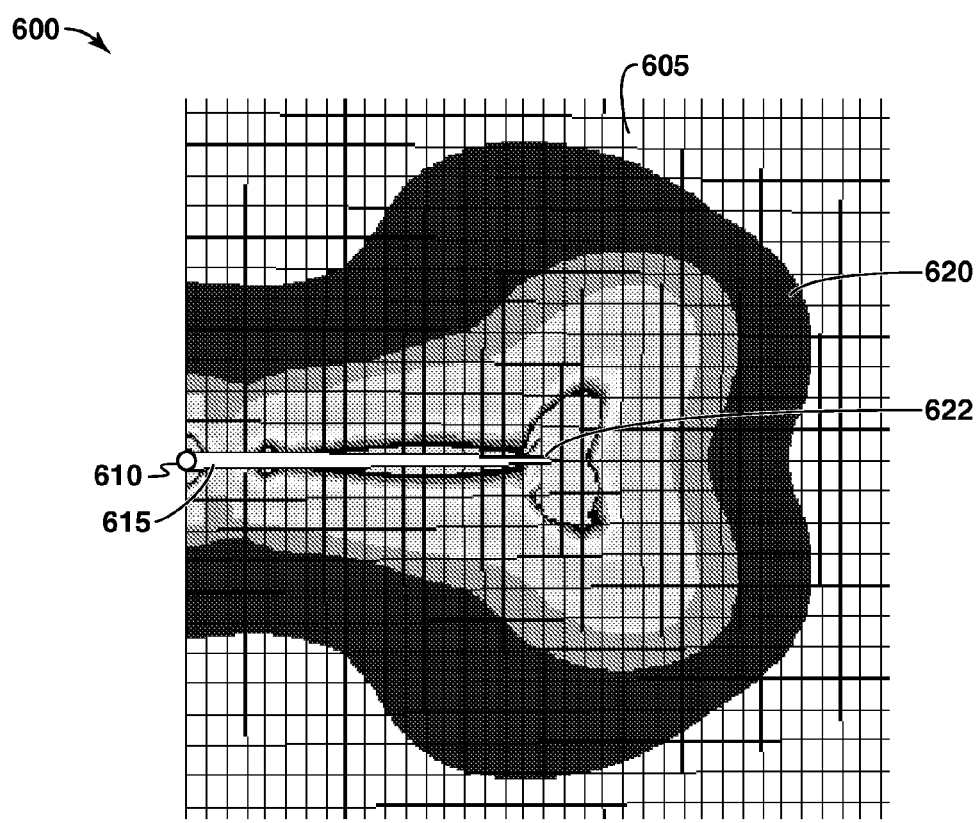
FIG. 6 presents another full physics simulation of injection into a weak, uncemented rock formation. In this instance, the well was used as a producer for six months, with the drawdown set at 1,000 psi. The well was then converted into an injection well.

FIG. 6 presents a second full physics simulation 600 of high rate injection into a weak, uncemented subsurface formation 605. In this simulation 600, a well 610 is once again indicated, with a half-symmetry domain. The well 610 is seen in plan view. The same parameters listed above are applied for the simulation 600. However, the well 610 was assumed to have been initially used as a producer for a period of time, until depleted to about 1,000 psi. In other words, formation pore pressure was reduced to about 1,000 psi.

In the simulation 600, it was assumed that the well 610 operated in production for six months. After this period of time, the well 610 was converted to an injection well. The injection rate was set at 40,000 barrels per day.

Contours are indicated at 620 around the well 610. The contours 620 again reflect plastic strain acting on the formation 605 downhole as a result of fluid injection. In FIG. 6, the contours 620 around the well 610 show a well-defined fracture 615. This fracture 615 is much longer than the fracture 515 formed in the simulation 500 of FIG. 5. However, there is also a large amount plastic strain around a tip 622 of the fracture 615. This is an indication that the fracture 615 has likely reached its maximum extent.

Under the simulation 600, the period of production reduced the pore pressure in the rock formation 605. This both increased the effective stress in the rock and hardened the rock material. When an aqueous solution was subsequently injected, it created a 3 to 4 meter long fracture in the rock formation. The fracture is predicted to be very wide. Thus, the change in effective stress in the formation 605 and the non-linear hardening of the rock due to some compaction allowed the injected fluid to create a well-defined fracture through the formation 605. In practice, if the injection well 610 tries to plug over time, the part of the subsurface formation 605 that becomes depleted will allow for some amount of fracture extension later in life.

The simulations provided in FIGS. 5 and 6 demonstrate that reservoir development procedures such as producing for a period of time can favorably affect the injection regime. By changing the regime, the operator can alter the geomechanical behavior of the subsurface formation to permit fracturing and, thereby, obtain a desired injectivity.

It is noted that unless the volume defined by the fracture 615 is stabilized with some additional material, it is possible that the improved injectivity that has been achieved with this completion may be lost when the injector well 610 is shut in. Therefore, in one aspect the volume of this fracture/void 615 may be filled with highly permeable material such as resin coated proppant. Resin coating on the proppant may serve to stabilize the proppant pack and to prevent it from being embedded by subsequent extreme fluid flow conditions during pressure transients in the injector.

As an additional option, the reservoir may be further produced until drawdown below 1,000 psi is achieved. This may aid in further enhancing water injectivity in a fracture mode.

As can be seen, the present invention addresses methods for identifying the regime of operation for water injection wells used to inject aqueous fluids into a subsurface rock formation. The present methods may have application in forecasting the likely regime of operation for water injectors. The present methods also have application in estimating the long-term injectivity and reliability for injection wells. The present methods provide methodology for estimating how changing reservoir conditions will impact the injectivity performance of water injectors.

While it will be apparent that the inventions herein described are well calculated to achieve the benefits and advantages set forth above, it will be appreciated that the inventions are susceptible to modification, variation and change without departing from the spirit thereof.

What is claimed is:

1. A method of injecting a fluid into a subsurface formation, comprising:
    obtaining data including an initial set of formation parameters related to a subsurface formation;
    obtaining data including an initial set of operational variables related to an injection well in the subsurface formation;
    using non-transitory computer readable instructions with a computer processor to:
        develop a heuristic model for the injection well comprising a graph plotting data points representing (a) the ratio of the formation's effective shear strength to the in-situ geomechanical load, versus (b) the ratio of the hydraulic load placed on the rock formation to the formation's transmissibility potential at different sets of input parameters;
        correlate the data points to one or more regimes of operation selected from a group consisting of a formation fluidization regime, a formation fracture regime, or a matrix injection regime; and
        determine a regime of operation for the injection well using the heuristic model based at least in part on the obtained data;
    identifying designed operational variables for conducting injection operations based at least in part on the determined regime of operation;
    determining a completion design, reservoir development procedures, injection procedures, or combinations thereof based at least in part on the determined regime of operation; and
    conducting injection operations in an injection well utilizing the designed operational variables.

2. The method of claim 1, wherein the injection well is an existing water injection well.

3. The method of claim 1, wherein the injection well is an existing production well being converted for an injection operation.

4. The method of claim 1, wherein the designed operational variables are selected to shift the regime of operation for the injection well from one regime to another.

5. The method of claim 1, wherein the subsurface formation is a weak-shear strength, uncemented formation, a weakly cemented formation, or a subsurface formation having a high degree of compressibility.

6. The method of claim 1, further comprising shifting the regime of operation from a formation fluidization regime or a matrix injection regime to a formation fracture regime by conducting injection operations.

7. The method of claim 1, wherein determining a regime of operation comprises:
    inputting the obtained data for the injection well into the heuristic model to generate an initial data point; and
    determining whether the initial data point falls within a formation fluidization regime, a formation fracture regime, or a matrix injection regime.

8. The method of claim 7, wherein the designed operational variables are different from the obtained initial operational variables and are selected to shift the regime of operation from one regime to another, and wherein conducting injection operations utilizing the designed operational variables comprises modifying a completion design, modifying reservoir development procedures, modifying injection procedures, or combinations thereof.

9. The method of claim 8, wherein the method further comprises:
determining a modified regime of operation for the injection well using the heuristic model and the designed operational variables; and
determining whether the modified regime of operation falls within the formation fluidization regime, the formation fracture regime, or the matrix injection regime.

10. The method of claim 8, wherein modifying injection procedures comprises (i) modifying an injection rate, (ii) modifying a viscosity of the fluid to be injected, (iii) modifying a temperature of the fluid to be injected, (iv) modifying a depth at which the fluid is injected, or (v) combinations thereof.

11. The method of claim 8, wherein modifying reservoir development procedures comprises (i) modifying a reservoir depletion plan, (ii) modifying the location of the injection well, (iii) adding an additional injection well, (iv) modifying a drilling plan for the injection well, (v) reducing the pore pressure in the subsurface formation, or (vi) combinations thereof.

12. The method of claim 11, wherein reducing the pore pressure in the subsurface formation comprises producing from the subsurface formation prior to operating the injection well.

13. The method of claim 8, wherein modifying a completion design comprises (i) providing equipment to heat or cool the injected fluids, (ii) providing equipment to add viscosity modifiers to the injected fluid, (iii) providing equipment to pump the injected fluid at an increased rate or pressure, (iv) modifying downhole equipment for the injection well, or (v) combinations thereof.

14. The method of claim 1, wherein the heuristic model uses (i) full physics computational simulations of injection, (ii) field data, or (iii) both to construct a mathematical model that can predict the operating regime for the injection well.

15. The method of claim 14, wherein the heuristic model comprises a graph that plots pressure as a function of time during injection into the subsurface formation.

16. The method of claim 1, wherein the ratio of the formation's effective shear strength to the in-situ geomechanical load is mathematically defined as:

S'/minimum principal stress wherein:
UCS=Uniaxial Compressive Strength of rock (psi/kPas)
$\beta$=Friction angle of the rock (degrees)
$S_v$=Formation overburden stress (psi/kPa)
$S_H$=Formation maximum horizontal stress (psi/kPa)
$S_h$=Formation minimum horizontal stress (psi/kPa)
Ds/d$\theta$=Change in formation horizontal stress per degree temperature change
PP=Pore pressure (psi or kPa)
$\theta_{fluid}$=Temperature of injected fluid (degrees F./C.)
$\theta_{rock}$=Temperature of formation (degrees F./C.)
$\Delta S^\theta$=Thermal stress reduction for cold water injection [Ds/d$\theta$×($\theta_{rock}$−$\theta_{fluid}$)] $\sigma_v$=Effective overburden stress ($S_v$−PP) (psi/kPa)
$\sigma_H$=Effective maximum horizontal stress ($S_H$−PP−$\Delta S^\theta$) (psi/kPa)
$\sigma_h$=Effective minimum horizontal stress ($S_h$−PP−$\Delta S^\theta$) (psi/kPa)
MES=Mean effective stress ($\sigma_v$+$\sigma_H$+$\sigma_h$)/3.0 (psi/kPa)
S'=MES×tan($\beta$)+[1−tan($\beta$)/3]×UCS (psi/kPa)
Minimum principal stress is the lesser of $S_h$ or $S_v$.

17. The method of claim 1, wherein the ratio of the hydraulic load placed on the rock formation to the formation's transmissibility potential is mathematically defined as:

[Q×E/$S_h$]/(K×H)/µ wherein
Q=Injection rate (bbl/day or cubes per day)
E=Elastic modulus of the rock (psi/kPa)
$S_h$=Formation minimum horizontal stress
K=Formation permeability (mDarcy)
H=Formation thickness or height TVD (feet or meters)
µ=Injected fluid viscosity (cp)
Minimum principal stress is the lesser of $S_h$ or $S_v$.

18. The method of claim 14, wherein constructing the mathematical model comprises:
calculating the ratio of the formation's effective shear strength to the in-situ geomechanical loads at various input parameters, wherein the various input parameters comprise formation parameters and operational variables;
calculating the ratio of the hydraulic load placed on the rock formation to the formation's transmissibility potential at the various input parameters;
determining for each of the various input parameters whether (a) formation fluidization occurred, (b) formation fracturing occurred, or (c) matrix injection occurred; and
plotting the calculated ratios as data points on a graph, the graph being divided into sections representing (a) a formation fluidization regime, (b) a formation fracture regime, and (c) a matrix injection regime.

19. The method of claim 18, wherein the data points plotted on the graph represent the ratio of the hydraulic load placed on the rock formation to the formation's transmissibility potential (the y-axis) versus the ratio of the formation's effective shear strength to the in-situ geomechanical loads (the x-axis) at the various input parameters.

20. The method of claim 18, wherein the graph permits a user to visually identify which of three modes of operation may prevail in the subsurface formation during a fluid injection process, the three modes representing (a) the formation fluidization regime, (b) the formation fracturing regime, or (c) the matrix injection regime.

21. The method of claim 1, further comprising:
determining a modified regime of operation;
determining the injection operations needed to shift the determined regime of operation to the modified regime of operation based at least in part on an amount of change required in (a) the ratio of the formation's effective shear strength to the in-situ geomechanical load, (b) the ratio of the hydraulic load placed on the rock formation to the formation's transmissibility potential at different sets of input parameters, or both; and
shifting from the determined regime of operation to the modified regime of operation by conducting the determined injection operations.

* * * * *